US009519700B2

(12) United States Patent
Behuria et al.

(10) Patent No.: US 9,519,700 B2
(45) Date of Patent: *Dec. 13, 2016

(54) AUTOMATICALLY SYNCHRONIZING PRODUCTION DATA OF A SOURCE SYSTEM AND A TARGET SYSTEM

(71) Applicant: International Business Machines Corporation, Armonk, NY (US)

(72) Inventors: Ajay K. Behuria, Bentonville, AR (US); James E. Bostick, Cedar Park, TX (US); John M. Ganci, Jr., Cary, NC (US); Souvik Majumdar, Kolkata (IN); Shuvamoy Saha, Bentonville, AR (US); David S. Wenk, Byron Center, MI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/148,355

(22) Filed: May 6, 2016

(65) Prior Publication Data

US 2016/0253399 A1 Sep. 1, 2016

Related U.S. Application Data

(63) Continuation of application No. 14/082,290, filed on Nov. 18, 2013, now Pat. No. 9,367,597.

(51) Int. Cl.
G06F 17/30 (2006.01)
G06F 17/24 (2006.01)

(52) U.S. Cl.
CPC ....... *G06F 17/30575* (2013.01); *G06F 17/246* (2013.01)

(58) Field of Classification Search
None
See application file for complete search history.

(56) References Cited

U.S. PATENT DOCUMENTS 7,302,446 B1 11/2007 Boothby et al.
7,516,157 B2 4/2009 Cameron et al.
(Continued)

FOREIGN PATENT DOCUMENTS

WO 2005/024626 3/2005

OTHER PUBLICATIONS

Len Erlikh, Integration, Leveraging Legacy System Dollars for E-Business, 1520-9202100/ copyright 2000 IEEE, May/Jun. 2000 IT Pro, pp. 17-23.
(Continued)

*Primary Examiner* — Richard Bowen
(74) *Attorney, Agent, or Firm* — Schmeiser, Olsen & Watts, LLP; John Pivnichny

(57) ABSTRACT

A method and associated system for managing rules that synchronize operations of a source system and a target system. A set of linked worksheets is generated as a function of the internal logic of the synchronization rules and of worksheets that represent data models of the source and target systems. These generated worksheets describe and relate data elements of the data models, extrinsic data that is stored externally to the source and target systems, and logical procedures performed by the synchronization rules. When the source data model, the target data model, or a logical procedure is revised, the linked worksheets are updated in response to the revision and these updates automatically propagate across the synchronization rules and across other components of the source system, the target system, and the synchronization mechanism.

16 Claims, 2 Drawing Sheets

(56) References Cited

U.S. PATENT DOCUMENTS

| | | |
|---|---|---|
| 7,584,422 B2 | 9/2009 | Ben-Yehuda et al. |
| 7,672,957 B2 | 3/2010 | Cotichini et al. |
| 2006/0242278 A1 | 10/2006 | Hawkins et al. |
| 2009/0037523 A1 | 2/2009 | Kolke et al. |
| 2009/0164491 A1 | 6/2009 | Cotichini et al. |
| 2009/0222834 A1 | 9/2009 | Gill et al. |
| 2009/0259744 A1 | 10/2009 | Kolke et al. |
| 2009/0271653 A1 | 10/2009 | Zhu et al. |
| 2010/0057759 A1 | 3/2010 | Cotichini et al. |
| 2010/0083221 A1 | 4/2010 | Naik et al. |
| 2010/0235321 A1 | 9/2010 | Shukla et al. |
| 2011/0166849 A1 | 7/2011 | Dube et al. |
| 2011/0218964 A1 | 9/2011 | Hagan et al. |
| 2011/0276636 A1 | 11/2011 | Cheng et al. |
| 2012/0203862 A1 | 8/2012 | Tayeb et al. |
| 2012/0240185 A1 | 9/2012 | Kapoor et al. |
| 2015/0082100 A1 | 3/2015 | Jain et al. |
| 2015/0142719 A1 | 5/2015 | Behuria et al. |
| 2015/0142737 A1 | 5/2015 | Behuria et al. |
| 2015/0142740 A1 | 5/2015 | Behuria et al. |

OTHER PUBLICATIONS

Arsanjani et al., Web, Mar. 2003 Queue, Copyright 2003 ACM 1542-773010310300, pp. 48-58.

Kane et al., ip.com, A systolic Design Rule Checker, Publication Date Jul. 31, 1983, IP.com No. IPCOM000151824D, 30 pages.

Ip.com, Analyzing and Decomposing A Plurality of Rules, IP.com No. IPCOM000166751D, IP.com Electronic Publication: Jan. 21, 2008, Authors: Disclosed Anonymously, 38 pages.

IBM, ip.com, Social Net Data Mining for Business Environments, Original Publication Date: Jul. 18, 2006, IP.com No. IPCOM000138435D, 3 pages.

Ip.com, System and Method for Requirements and Capabilities Pairing via Self-Learning Analytical Engine, IP.com No. IPCOM000226901D, IP.com Electronic Publication: Apr. 23, 2013, Authors: Disclosed Anonymously, 4 pages.

U.S. Appl. No. 14/082,375, filed Nov. 18, 2013, First Named Inventor Ajay K. Behuria.

U.S. Appl. No. 14/082,548, filed Nov. 18, 2013, First Named Inventor Ajay K, Behuria.

Office Action (Dec. 24, 2015) for U.S. Appl. No. 14/082,290, filed Nov. 18, 2013.

Amendment (Jan. 28, 2016) for U.S. Appl. No. 14/082,290, filed Nov. 18, 2013.

Notice of Allowance (Mar. 17, 2016) for U.S. Appl. No. 14/082,290, filed Nov. 18, 2013.

Office Action (Sep. 3, 2015) for U.S. Appl. No. 14/082,548, filed Nov. 18, 2013.

Amendment (Nov. 23, 2015) for U.S. Appl. No. 14/082,548, filed Nov. 18, 2013.

Office Action (Apr. 20, 2016) for U.S. Appl. No. 14/082,548, filed Nov. 18, 2013.

Wyner et al., CS50AE: Information Extraction and Text Analytics, 21 pages.

Instructor: Jamie Callan, Text Analytics: 95-865(A), Retrieved from internet on Dec. 15, 2015, http://boston.lti.cs.cmu.edu/classes/95-865/, 3 pages.

Survey text mining with IBM SPSS Text Analytics for Surveys, Part 1: Exploring sample survey data, Jun. 3, 2014, Retrieved from internet on Dec. 15, 2015, http://www.ibm.com/developerworks/library/ba-spss-survey-text-mining1/, 29 pages.

Amendment (Apr. 26, 2016) for U.S. Appl. No. 14/082,548, filed Nov. 18, 2013.

AUTOMATICALLY SYNCHRONIZING PRODUCTION DATA OF A SOURCE SYSTEM AND A TARGET SYSTEM

This application is a continuation application claiming priority to Ser. No. 14/082,290, filed Nov. 18, 2013.

TECHNICAL FIELD

The present invention relates to managing rules that synchronize two or more software applications, computer systems, or other electronic systems.

BACKGROUND

It may be necessary to run two or more systems concurrently, simultaneously, or in parallel, such as when migrating users from a legacy software system to a new, more modern, software system, when comparing the operation of equivalent applications that run on different computer platforms, or when measuring relative efficiency of programs that perform similar functions by means of different algorithms. In such cases, each system may comprise a combination of one or more software applications, computer systems, other computerized entities, other electronic entities, or one or more components of one or more communications infrastructures.

During such operation, it may be necessary to synchronize the operation of the two or more systems such that the two or more systems perform equivalent functions, store identical or equivalent repositories of information, or both produce equivalent or otherwise predictable output in response to equivalent input.

Synchronization may comprise functions like resolving differences between a pair of data models that each represent one or more data structures of one of the systems, resolving inconsistencies between each system's repository of production data, or ensuring that, when fed identical or analogous input, a component of one system and an analogous component of an other system correctly produce identical, similar, or analogous output.

One means of synchronization is a mechanism by which a monitoring entity detects revisions to production data stored by one or more of the systems being synchronized or detects revisions to a data model that represents a data structure or data organization associated with one of the systems being synchronized. This monitoring entity may be a hardware or software component of one of the systems being synchronized or it may be a distinct "intermediary" hardware or software entity that monitors the operation of the systems to be synchronized.

Such a monitoring entity may respond to a detection of a first revision to a first system by making a second revision or set of revisions to one or more other systems, in order to synchronize the operation of or the production data of the one or more other systems with the operation or data of the first system.

In such a case, the details or method of the second revision or set of revisions may be determined by one or more synchronization rules that tell the monitoring entity how to respond to a certain type of revision to the first system in order to synchronize the one or more other systems to the revised first system. A synchronization rule may also similarly describe how to translate a change to a data model or other data representation of the first system into an analogous change to a data model or other data representation of the one or more other systems. Such translations may not be trivial or obvious, especially when a data model or other data representation of the first system differs in a significant way from a data model or other data representation of the one or more other systems.

These synchronization rules may be difficult to generate and maintain with accuracy. Components of each system may be added, removed, patched, or otherwise modified in different ways and at different times, and each modification may necessitate revising, deleting, or creating one or more of the synchronization rules associated with the system. If the rules are not promptly updated to accommodate such changes, a rule may not identify a correct synchronization procedure when a monitoring entity identifies a need for synchronization. When synchronizing complex systems that require large numbers of rules, the tasks of generating and maintaining those rules may be complicated, vulnerable to error, and resource-intensive. There is thus a need for a way to automatically create, verify, and maintain synchronization rules in order to ensure that the rules are accurately and promptly created, deleted, or revised whenever necessary, and to confirm that the rules continue to correctly synchronize the systems.

BRIEF SUMMARY

A first embodiment of the present invention provides a method for automatically managing a set of synchronization rules that resolve inconsistencies between a source repository of production data managed by a source system and a target repository of production data managed by a target system, wherein a source data worksheet represents a logical organization of the source repository, a target data worksheet represents a logical organization of the target repository, a record of the source data worksheet describes a logical source data element comprised by the logical organization of the source repository, a record of the target data worksheet describes a logical target data element comprised by the logical organization of the target repository, and a first synchronization rule of the set of synchronizations rules instructs a processor of a computer system how to resolve a first inconsistency between the logical source data element and the logical target data element, the method comprising:

the processor generating a source-to-rule mapping worksheet, wherein a first record of the source-to-rule mapping worksheet associates the logical source data element with the first synchronization rule;

the processor generating an extrinsic data-to-rule mapping worksheet, wherein a record of the extrinsic data-to-rule mapping worksheet is capable of associating an extrinsic data element with the first synchronization rule, and wherein the extrinsic data element is comprised by neither the source repository nor the target repository;

the processor generating a target-to-rule mapping worksheet, wherein a record of the target-to-rule mapping worksheet associates the logical target data element with the first synchronization rule; and the processor generating a rule-logic worksheet, wherein a record of the rule-logic worksheet associates the first synchronization rule with a logical procedure by which the processor may resolve the first inconsistency; and the processor automatically responding to a revision to a first revised record of a first worksheet by automatically revising a second revised record of a second worksheet, wherein the first worksheet is distinct from the second worksheet, the first worksheet and the second worksheet are selected from the group comprising the source data worksheet, the target data worksheet, the source-to-rule mapping worksheet, the extrinsic data-to-rule mapping worksheet, the target-to-rule mapping worksheet, and the rule-logic worksheet, and wherein the automatically revising is performed by means of a linkage between the first revised record and the second revised record.

A second embodiment of the present invention provides a computer program product, comprising a computer-readable hardware storage device having a computer-readable program code stored therein, said program code configured to be executed by a processor of a computer system to implement a method for automatically managing a set of synchronization rules that resolve inconsistencies between a source repository of production data managed by a source system and a target repository of production data managed by a target system, wherein a source data worksheet represents a logical organization of the source repository, a target data worksheet represents a logical organization of the target repository, a record of the source data worksheet describes a logical source data element comprised by the logical organization of the source repository, a record of the target data worksheet describes a logical target data element comprised by the logical organization of the target repository, and a first synchronization rule of the set of synchronizations rules instructs a processor of a computer system how to resolve a first inconsistency between the logical source data element and the logical target data element, the method comprising:

the processor generating a source-to-rule mapping worksheet, wherein a first record of the source-to-rule mapping worksheet associates the logical source data element with the first synchronization rule;

the processor generating an extrinsic data-to-rule mapping worksheet, wherein a record of the extrinsic data-to-rule mapping worksheet is capable of associating an extrinsic data element with the first synchronization rule, and wherein the extrinsic data element is comprised by neither the source repository nor the target repository;

the processor generating a target-to-rule mapping worksheet, wherein a record of the target-to-rule mapping worksheet associates the logical target data element with the first synchronization rule; and the processor generating a rule-logic worksheet, wherein a record of the rule-logic worksheet associates the first synchronization rule with a logical procedure by which the processor may resolve the first inconsistency; and the processor automatically responding to a revision to a first revised record of a first worksheet by automatically revising a second revised record of a second worksheet, wherein the first worksheet is distinct from the second worksheet, the first worksheet and the second worksheet are selected from the group comprising the source data worksheet, the target data worksheet, the source-to-rule mapping worksheet, the extrinsic data-to-rule mapping worksheet, the target-to-rule mapping worksheet, and the rule-logic worksheet, and wherein the automatically revising is performed by means of a linkage between the first revised record and the second revised record.

A third embodiment of the present invention provides a computer system comprising a processor, a memory coupled to said processor, and a computer-readable hardware storage device coupled to said processor, said storage device containing program code configured to be run by said processor via the memory to implement a method for automatically managing a set of synchronization rules that resolve inconsistencies between a source repository of production data managed by a source system and a target repository of production data managed by a target system, wherein a source data worksheet represents a logical organization of the source repository, a target data worksheet represents a logical organization of the target repository, a record of the source data worksheet describes a logical source data element comprised by the logical organization of the source repository, a record of the target data worksheet describes a logical target data element comprised by the logical organization of the target repository, and a first synchronization rule of the set of synchronizations rules instructs a processor of a computer system how to resolve a first inconsistency between the logical source data element and the logical target data element, the method comprising:

the processor generating a source-to-rule mapping worksheet, wherein a first record of the source-to-rule mapping worksheet associates the logical source data element with the first synchronization rule;

the processor generating an extrinsic data-to-rule mapping worksheet, wherein a record of the extrinsic data-to-rule mapping worksheet is capable of associating an extrinsic data element with the first synchronization rule, and wherein the extrinsic data element is comprised by neither the source repository nor the target repository;

the processor generating a target-to-rule mapping worksheet, wherein a record of the target-to-rule mapping worksheet associates the logical target data element with the first synchronization rule; and the processor generating a rule-logic worksheet, wherein a record of the rule-logic worksheet associates the first synchronization rule with a logical procedure by which the processor may resolve the first inconsistency; and the processor automatically responding to a revision to a first revised record of a first worksheet by automatically revising a second revised record of a second worksheet, wherein the first worksheet is distinct from the second worksheet, the first worksheet and the second worksheet are selected from the group comprising the source data worksheet, the target data worksheet, the source-to-rule mapping worksheet, the extrinsic data-to-rule mapping worksheet, the target-to-rule mapping worksheet, and the rule-logic worksheet, and wherein the automatically revising is performed by means of a linkage between the first revised record and the second revised record.

DETAILED DESCRIPTION

Figure 1:
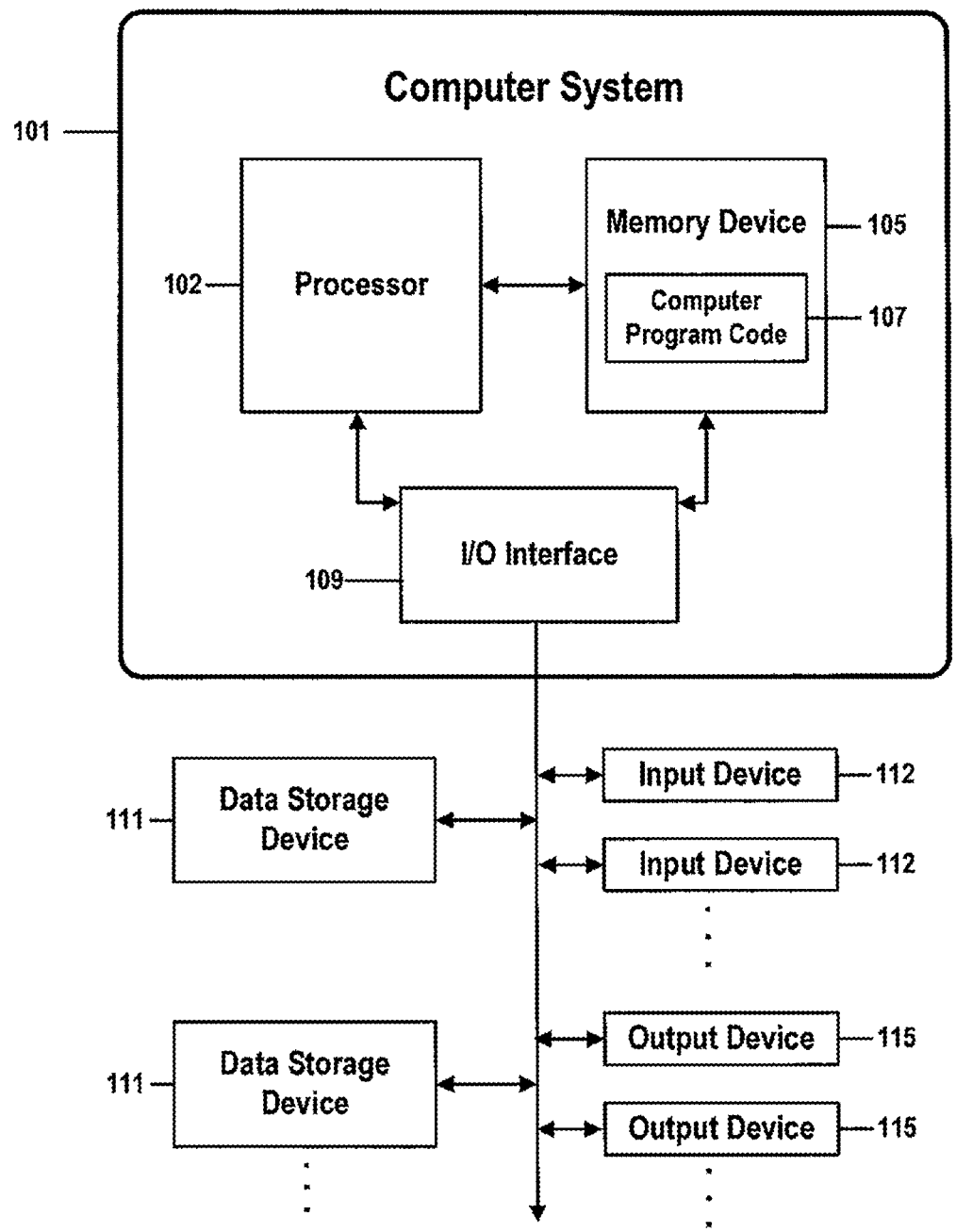
FIG. 1 shows the structure of a computer system and computer program code that may be used to implement a method for automatically managing mapping and transform rules when synchronizing systems in accordance with embodiments of the present invention.

Embodiments of the present invention automate a process of creating and maintaining sets of mapping and transformation (or "transform") rules that synchronize one or more source systems to one or more target systems.

Although this disclosure generally describes methods of synchronizing two systems, the present invention is not limited to two-system embodiments. Methods of the present invention may be extended to the synchronization of any number of systems, and may synchronize a larger group of systems or subsets of a larger group of systems by organizing those systems into a plurality of pairs, into a plurality of groups that each comprise more than two systems, or in other ways.

Some embodiments of the present system may use analogous methods to synchronize messages communicated between two entities. Here, methods used in other embodiments to synchronize databases described by two different data models may be applied instead to synchronize messages described by two different message models, where a message model describes a format in which a message represents information.

One such message-model embodiment might, for example, synchronize messages sent from and understood by a first entity in a first message format based on a first message model, with messages sent from and understood by a second entity in a second message format based on a second message model. Such a first entity might, for example, comprise a first communications system that sends and receives network traffic as a set of packets that conform to the TCP/IP (Transmission Control Protocol/Internet Protocol) standard; and a second such entity might comprise a second communications system that sends and receives network traffic as a set of packetized messages that conform to the OSI (Open Systems Interconnect) protocol stack. In this example, an embodiment of the present invention might, using methods analogous to those described herein, analyze a message model that represents an organization of the TCP/IP packets and then further analyze a message model that represents an organization of the OSI packetized messages and, in response, select synchronization rules, access cross-references, and perform other functions analogous to those described herein, in order to allow the first communications system and the second communications system to exchange data and process the exchanged data in consistent ways, despite inconsistencies among the respective message models.

One method of synchronizing two or more systems is by means of an intermediary entity that monitors the operation of the two systems and generates event messages that describe a revision to a first component of a first, or "source" system that may place the first system out of synchronization with the a second, or "target" system.

In one example, if a user changes her account number in an account-tracking module of a source system, a message documenting that number-changing event may be sent to a target system, or to an third-party "intermediary" monitoring entity. This event message may be generated by the source system or by the target system by means known to those skilled in the art, may be generated by a component of the intermediary entity, or may be generated by a distinct monitoring or synchronization entity.

In this example, the event message may provide information that permits the target system or intermediary to then take steps to ensure that an account-tracking function of the target system is appropriately updated in response to the account-number change. The target-system module, or the account-number information that the module tracks, would thus be modified as though the user had changed her account number in the target system.

In another example, consider a source system and a target system that maintain a customer list. If a new customer named "John Smith" is added to the source system's customer list, the source system, or a third-party intermediary system, might then generate and communicate a message to the target system instructing the target system to add customer "John Smith" to the target system's analogous customer list.

A synchronization mechanism that keeps a pair of systems synchronized in this way may be deemed "bidirectional" if it can send messages in either direction, in response to revisions to either system.

For example, a bidirectional synchronization mechanism that synchronizes a legacy software application with a newer, beta-version software application may deem either the legacy application or the beta application to be a "source" system that has been revised by an event that triggers the sending of a message. Here, if the legacy system is the source, the beta system would then be designated a "target" system that must be updated in order to remain synchronized with the legacy source. These designations, however, would be reversed if a later, second event modifies the beta (the previous "target"), resulting in a need to revise the previous "source" legacy system in order to keep the two systems synchronized. In other words, a system revised by an event is deemed a "source" and a system that must be revised by the synchronization mechanism in response to the event is deemed a "target." A bidirectional synchronization mechanism may synchronize either of two systems in response to an event that revises the other system.

When an event message identifies an event that may require a procedure in order to synchronize a target system to the revised source system, the details of this procedure may be described by one or more stored synchronization rules. Rules may perform many types of mapping and transform functions. If, for example, a customer name stored by a source system is revised such that it is no longer identical to an equivalent name stored by a target system, synchronization may require copying the revised customer name in the source system to a database maintained by the target system. In this case, a synchronization rule might enable this copying by associating (or "mapping") a "CustomerName" field in a source database with an equivalent "CustName" field in the target database.

Such mapping may comprise more complex functions or transformations. A synchronization rule may, for example, associate a "CustomerName" field in a source database with a pair of "FirstName" and "LastName" fields in one or more target databases, and may further describe steps for dividing a "CustomerName" string into "FirstName" and "LastName" substrings.

In some cases, a rule may require data stored in a source system to be translated into a different data format, or into a different data structure in order to be exported to a target system.

Some synchronizations rules may comprise steps that require assembling a data element of a target system from multiple changed and unchanged data elements of a source system; from a combination of such data elements and extrinsic data elements retrieved from external sources, such as the Internet; or as a function of conditions identified by a combination of source, target, and extrinsic data elements. Many other types of functions are possible, some of which are complex enough to require a rule to comprise a script, a set of pseudocode instructions, or a computer program.

Consider, for example, an embodiment in which a source system stores a customer name in two fields, "LastName" and "FirstName," but a target system stores the same customer name as a single field "CustomerName." Here, if a user changes the spelling of his first name in the source system, a synchronization mechanism might respond to an event message documenting this change by performing the following steps:

i) identify and retrieve from the source system the unchanged "LastName" value that corresponds to the user's changed "FirstName";

ii) concatenate the changed "LastName" value to the retrieved "FirstName" value; and iii) store the concatenated value as a revised instance of the "CustomerName" field in the target system.

Such a rule may be characterized as an "augmented" rule because it requires "augmenting" the changed "FirstName" value with a second, independently retrieved, unchanged "LastName" value. In general, an augmented synchronization rule performs a function that requires more than one input data element, and in some cases, this more than one input data element may comprise one or more elements retrieved from an external source distinct from either the source system or the target system. Such an external source may comprise, but is not limited to, a Web page, a log file, or a stored reference document.

Messages and rules may be created, implemented, and maintained by a variety of means known to those skilled in the art. As described above, an intermediary software application, computer system, or other entity may, for example, monitor source and target systems, generate a message when it detects a revision event to either system's stored production data, or perform a synchronization function or procedure in response to the event or in response to detection of the message.

Such mechanisms may comprise different combinations of automated and manual tasks. For example, a synchronization function or procedure may be performed automatically by a synchronization rule that was manually drafted by a system designer as a function of a manual analysis of data models associated with the source and target systems. In other cases, a synchronization function or procedure may be triggered manually in response to an automatically generated event message.

Revisions to a data model of a source or a target system may comprise restructuring or reorganizing data elements of a data model of either system or may comprise an addition of or a revision to a condition upon how a data element of a source data model is mapped or transformed into a format or structure that is compatible with a target data model.

Because both source and target data models may undergo such updating on a continuous or ongoing basis, mapping and transformation rules may themselves need to be continuously or repeatedly revised in response to system revisions. These revisions may be performed manually, but such manual procedures may be prohibitively cumbersome and resource-intensive if a system undergoes frequent revisions, comprises a large number of data models, data elements, program modules, or other components, or comprises coupled or related components such that a revision to a single component may affect other components.

Furthermore, when it is possible for a source system and a target system to produce inconsistent output or to otherwise lose synchronization with each other, it is essential to identify a "source of truth" for a transaction, data representation, data lookup, or other operation or function, wherein the source of truth is the entity that is most likely to be correct.

When an intermediary application generates or maintains synchronization rules within an ESB infrastructure, the intermediary, or the set of rules that the intermediary generates, maintains, or performs, may itself become an additional possible source of truth. This may occur, for example, if the intermediary stores rules as a design document that is distinct from the source system, from the target system, and from the data models and production data associated with the source and target systems.

Here, the design document becomes an additional possible source of truth for the data models because, if the intermediary application does not scrupulously update the design document every time a source system's data model or a target system's data model is updated or revised, the rules in the design document may produce incorrect or inconsistent results, even if the source system or the target system would otherwise produce accurate results. In other words, using methods known to those skilled in the art, a design document maintained by an intermediary or by manual means must itself be kept in synchronization with both the source and the target system, thereby increasing, rather than decreasing, the cost of synchronization.

In an example of a platform that suffers from such constraints, consider an "enterprise service bus" (ESB) or "integration broker" architecture, wherein synchronization rules may be performed or maintained by an intermediary application distinct from source and target systems. In such an ESB architecture, based on conventions and standards known to those skilled in the art, the intermediary application may automatically generate simple mapping and transformation rules that allow a source system and a target system to remain in synchronization.

Simple brute-force ESB-compliant software tools may be able to automatically generate some mapping synchronization rules and in a few cases, may be able to generate certain simple transform synchronization rules, but such tools generally have significant limitations. Most, for example, require source and target data models to conform to a specific format, platform, and data structure, such as an XML (Extensible Markup Language) schema.

In most cases, applications and tools in this field of design are instead limited to model-documenting or model-representing tools. Such tools may be able to represent a data model of a system by means of a standard representational language or syntax, such as Extensible Markup Language (XML), but are not specifically designed or intended to compare generated data models or otherwise infer or generate rules for synchronizing systems associated with such data models.

Furthermore, such tools, including such XML-based model-generation applications, generally manage or store data model representations or rules in what may be a large number of external design documents that themselves become a redundant, source of truth for the original source and target data models. When a data element of a source or target data model is revised, any such design documents associated with the revised element must be identified and updated in order to ensure that the entire set of design documents remains synchronized with both the source and target systems and the true data models associated with the source and target systems. Such additional synchronization requirements may add burdensome complexity and fallibility to a synchronization mechanism.

Embodiments of the present invention provide a different solution by creating a set of data structures that store and automatically cross-reference information about data models of a source system, data models of a target system, extrinsic data elements that may be retrieved from an external information source, and a set of synchronization rules. In particular, these data structures may comprise: a set of mapping and transformation rules; a cross-reference between data elements of the source data model and the stored rules; a cross-reference between data elements of the target data model and the stored rules; and a cross-reference between the external data elements and the stored rules.

In embodiments of the present invention, this set of data structures may be stored in any storage format or in any storage medium known to those skilled in the art of computer science and may be stored as any type of tabular data structure known to those skilled in the art of computer science. In an embodiment of the method of FIG. 2, such a tabular representation may be stored on a computer-storage device as one or more worksheets of a spreadsheet application.

These data models may comprise any representation of a data format used by either of the source or target software application or system. These data formats may comprises, but are not limited to, tabbed, grouped, or independent spreadsheet program worksheets, combinations of flat files, relational databases, inverted databases, other type of databases, data dictionaries of one or more databases, knowledgebases, ontologies and schemas, triple stores, directed graphs, enumerations, comma-delimited lists, or other types of lists, and other data structures or information repositories known to those skilled in the relevant arts.

In some embodiments, a relation between a data structure associated with a rule and a data structure related to a data model of a source system may allow a rule to be automatically updated when there is a change to the source system. Similarly, in some embodiments, a relation between a data structure associated with a rule and a data structure related to a data model of a target system may allow a rule to be automatically updated when there is a change to the target system. In both cases, if a source system data model or a target system data model is a source of truth before the source data model or the target data model is changed, that model remains the source of truth after the rule is automatically updated in response to the change. The worksheets created by the present invention may be considered a source of truth for the synchronization rules that keep the source and target production data synchronized, but they do not cast themselves as a redundant source of truth for any source or target data model.

Embodiments of the present invention may make managing mapping and transformation rules more efficient and reliable by reducing a need for redundant rule management. Because an embodiment of the present invention may automatically link or cross-reference a data element of a source data model to all rules associated with that data element, a revision to the source data model that comprises a change to the data element may be represented by a single revision to the cross-reference. This single change will then automatically ripple through all rules that the embodiment has linked or cross-referenced to the data element. There is thus no need for system administrators or designers to manually identify and revise all rules that may directly or indirectly depend upon the revised data element.

In some embodiments, similar benefits may accrue when a data element of a target data model changes, or when there is a relevant change to a characteristic of an extrinsic data element upon which the source or target system depends or upon which a synchronization rule otherwise depends.

Consider, for example, a set of transformation rules that comprises five rules that each transform a first data element of a source system in a different way. One rule might, for example, duplicate a transaction record entered into the source system as a record in a target-system PrintBuffer table if a print flag is set; a second rule might store certain fields of the transaction record in a Receivables table if the record's "credit" attribute is set; and the third, fourth, and fifth records might perform other operations that depend upon the state of other conditions or variables.

In a manual synchronization system, a change in the format of the way these transaction records are stored in the source system—such as increasing the length of a customer account number from 5 digits to 8 digits—might require an administrator to manually identify and modify all five rules that depend upon the transaction record's account-number field, and to then further identify any other rules that might be indirectly affected by the modification.

Embodiments of the present invention, however, would simplify or automate most of these tasks, requiring a representation of the transaction record to be changed only one time. This change would then, by means of the cross-reference, automatically propagate through all five rules that depend directly or indirectly upon the transaction record data element.

As described above, some embodiments may automatically identify a rule as being "augmented" if the rule comprises an output field that depends upon more than one input field. In some embodiments, when the augmented rule is updated or revised in response to an other change, such as an update or other revision to a source data model, a target data model, or an external information source, then the rule's identification as an augmented rule would alert the embodiment that all of the rule's input fields must be considered in the updating or revision.

Consider, for example, a rule that combines a "First-Name" source-system input field with a "LastName" source-system input field to create a "CustomerName" target-system database key, thus defining a relationship wherein the CustomerName data element of the target system depends upon two input fields stored ins the source system.

Embodiments of the current invention would know that, if the length of the LastName data element in a source data model is increased from 9 characters to 12 characters, then the CustomerName element of the target data model, and in all rules that depend directly or indirectly upon the CustomerName element, might correspondingly need to be increased.

Here, however, the embodiment, by means such as counting the number of input fields or otherwise relating a number of input fields of a rule to associated output fields, might automatically identify the rule as being "augmented." Thus, when the augmented rule is triggered in response to a revision of a FirstName value in a source-system production database, the embodiment would automatically know to proactively retrieve a corresponding LastName value.

In this complex example, the embodiment would have to account for the fact that only the LastName data element had been changed in the source system's data model, but only the FirstName value had changed in the source system's production-database. Using mechanisms described above, the embodiment would be able to correctly create the CustomerName key in the target system's production database, by determining that the length of the CustomerName element would have to be increased by three characters because the definition of the LastName element had been changed in the source data model.

Embodiments of the present invention may thus comprise an iterative process that continues to generate, relate, and revise mapping and transformation rules in response to a revision to a data element of the source system's data model, to a data element of the target system's data model, or to a characteristic of an extrinsic data element of an external information source that is associated with a synchronization rule.

FIG. 1 shows the structure of a computer system and computer program code that may be used to implement a method for automatically managing mapping and transform rules when synchronizing two systems in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium(s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code, said program code implementing methods of the present invention, do not comprise a signal generally, or a transitory signal in particular.

Any combination of one or more computer-readable medium(s) or devices may be used. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection, a portable computer diskette, a hard disk, a random access memory (RAM), a read-only memory (ROM), an erasable programmable read-only memory (EPROM or flash memory), Radio Frequency Identification tag, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, a broadcast radio signal or digital data traveling through an Ethernet cable. Such a propagated signal may take any of a variety of forms, including, but not limited to, electro-magnetic signals, optical pulses, modulation of a carrier signal, or any combination thereof.

Program code embodied on a computer-readable medium may be transmitted using any appropriate medium, including but not limited to wireless communications media, optical fiber cable, electrically conductive cable, radio-frequency or infrared electromagnetic transmission, etc., or any suitable combination of the foregoing.

Computer program code for carrying out operations for aspects of the present invention may be written in any combination of one or more programming languages, including, but not limited to programming languages like Java, Smalltalk, and C++, and one or more scripting languages, including, but not limited to, scripting languages like JavaScript, Perl, and PHP. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), an intranet, an extranet, or an enterprise network that may comprise combinations of LANs, WANs, intranets, and extranets, or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIGS. 1-4 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions that implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

The flowchart illustrations and/or block diagrams FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, wherein the module, segment, or portion of code comprises one or more executable instructions for implementing one or more specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for automatically managing mapping and transform rules when synchronizing two systems in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105.

Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for automatically managing mapping and transform rules when synchronizing two systems.

Any of the components of the present invention could be created, integrated, hosted, maintained, deployed, managed, serviced, supported, etc. by a service provider who offers to facilitate a method for automatically managing mapping and transform rules when synchronizing two systems. Thus the present invention discloses a process for deploying or integrating computing infrastructure, comprising integrating computer-readable code into the computer system 101, wherein the code in combination with the computer system 101 is capable of performing a method for automatically managing mapping and transform rules when synchronizing two systems.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for generating a service-catalog entry from discovered attributes of provisioned virtual machines may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for generating a service-catalog entry from discovered attributes of provisioned virtual machines is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107.

An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
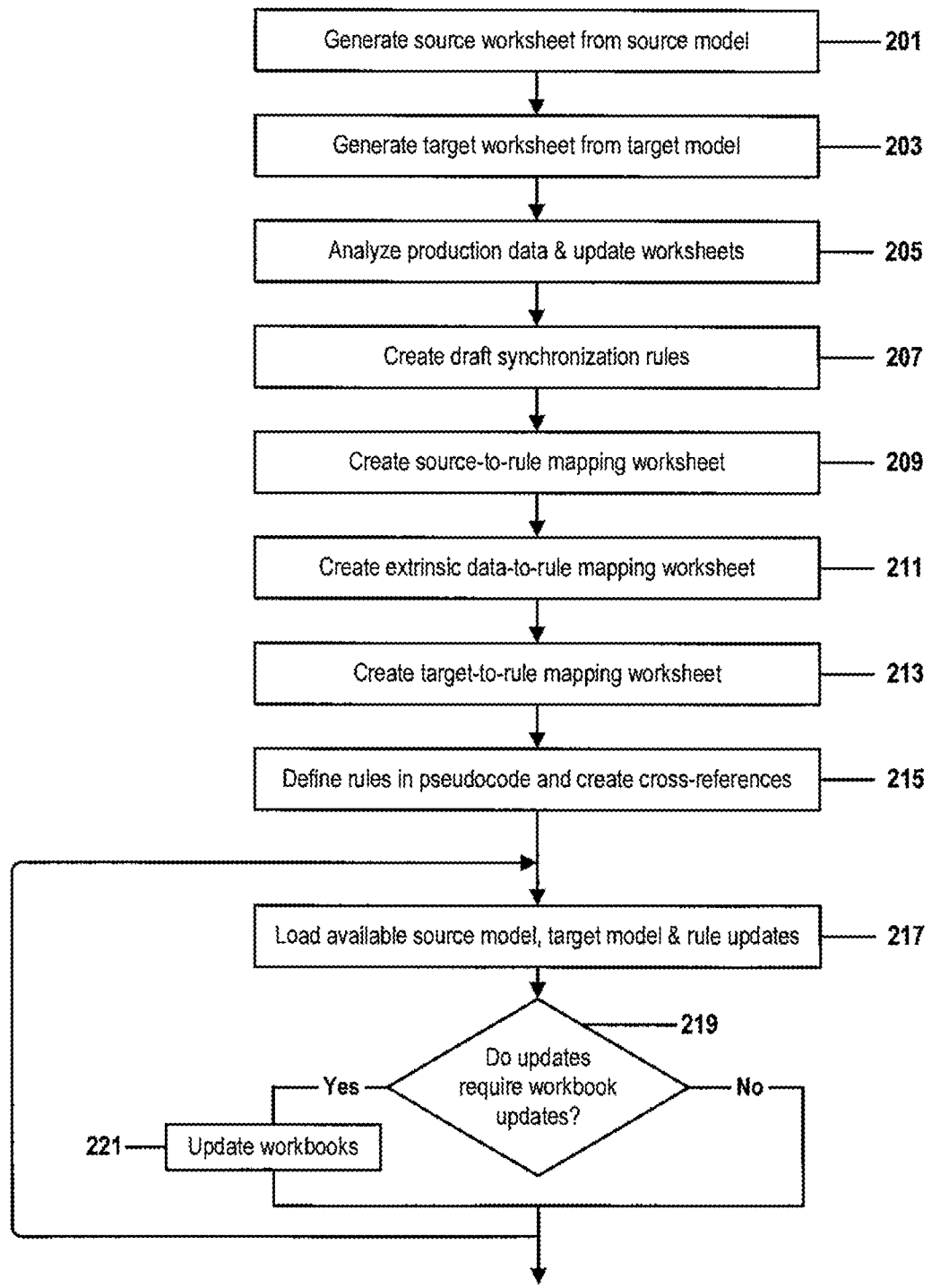
FIG. 2 is a flow chart that illustrates steps of a method for automatically managing mapping and transform rules when synchronizing two systems in accordance with embodiments of the present invention.

FIG. 2 is a flow chart that illustrates steps of a method for automatically managing mapping and transform rules when synchronizing two systems in accordance with embodiments of the present invention. FIG. 2 contains steps 201-221.

In step 201, embodiments of the present invention load one or more data models or other descriptions of one or more data elements, data structures, message elements, or logic elements associated with a source system and translate the loaded models or other descriptions into a source worksheet.

As described above, these data models or other descriptions may take any form known to those skilled in the art of data modeling, information technology, or related fields, where such a form may comprise, but is not limited to, a combination of one or more databases, flat files, knowledgebases, schemas, subschemas, ontologies, Erwin data models, scripts, source code listings, pseudocode, or unstructured information repositories. The form of the source data model must, however, make it possible to infer or otherwise identify one or more data elements that may be associated with one or more data elements comprised by the target system.

In some embodiments, this data model may comprise a message model that describes how data or other content is organized, structured, or otherwise represented in a communicated message, such as an Ethernet packet or a communication between a pair of transaction-processing systems. Such embodiments may comprise a method to synchronize source and target message models by means of a procedure analogous to the methods described below to synchronize source and target data models.

The source worksheet created from the loaded source models or other descriptions represents data elements inferred or otherwise identified in the loaded source models or other descriptions. In some embodiments, the source worksheet may also comprise inferred representations of logical relations among source elements, such as organizations of elements into a data structure like a record, table, hierarchy, or a row or column of a table, or such as an index-data relationship that identifies a first element as an index by which to identify or sort instances of a second element.

The source worksheet may take any structured or unstructured form from which may be identified or inferred a data element, a characteristic or set of characteristics of a data element, or a relationship among multiple data elements of the loaded source models or other descriptions.

All or part of an organization of the source worksheet may be determined as a function of implementation-dependent considerations. In embodiments described herein, a worksheet may associate an instance of a standard data structure with every data element inferred or otherwise identified from the loaded source models or other descriptions.

In some embodiments, such an instance might, for example, comprise an identifier of a data element, a description of the element's storage format, an identifier of a data structure in a source model that comprises the element, and a freeform Comment field that describes the element by means of unstructured text.

In some embodiments, such an instance might comprise custom fields that allow the instance to be cross-referenced to, mapped to, or otherwise associated with, information in another worksheet created by the embodiment.

In step 201, embodiments of the present invention generate the source worksheet by exporting information from the loaded source models or other descriptions into a form described by a source worksheet template.

If, for example, the source worksheet template is implemented as a worksheet of a spreadsheet program, and a source data model comprises a database schema, generating the source worksheet might comprise a process of populating a row of the worksheet for each data element identified by the schema. Each row of the populated might then comprise columns of data that together describe all characteristics of a schema data element that are relevant to the embodiment.

A source worksheet may be created from a template by means of a manual procedure, an automated procedure, or a combination thereof, wherein such procedures and the means by which they may be performed are known to those skilled in the art.

Such a procedure may infer relationships among data elements all or in part by means of a combination of methods known to those skilled in the art, which may comprise, but are not limited to, comparing a data model to a standard or convention, identifying keywords associated with field identifiers or record identifiers, semantic analysis of a schema or ontology, syntactic analysis of a schema or ontology, or extrinsic logic or data inferred from an application or external information source.

In some embodiments, these inferences may be drawn all or in part by means of manually entered data, where the manually entered data may associate a field in one data model with one or more fields in the other data model, or may identify some other type of dependency or other relationship between such fields.

In one example, if a source data model is an ERwin data model that conforms to the known ERwin data-model convention, an ERwin-compliant analysis or modeling tool may be used to tranlate the source ERwin model into an equivalent flat-file format. Such a translation might be a straightforward automated process that creates a row in the flat file for each data element of the ERwin model.

Here, the columns associated with a particular data element's row might comprise identifications of a table that contains the element, of a subschema that comprises the table, and of the element's storage format. Other columns might further comprise a flag that identifies whether the element is a primary key, and a field of free-form comments that may be used for reporting or maintenance purposes.

A source data model that describes four elements organized into two tables in a single subschema might thus give rise to the file:

| Element | Table | Subschm | Fmt | PK? | Comments |
|---|---|---|---|---|---|
| 1stNm | CustName | CustData | 10CH | N | 10-character customer first name |
| LstNm | CustName | CustData | 18CH | N | 18-character: customer surname |

-continued

| Element | Table | Subschm | Fmt | PK? | Comments |
|---------|-------|---------|-----|-----|----------|
| Acct# | AcctInfo | CustData | 10CH | Y | 10-char primary key: Account # |
| AcctOp | AcctInfo | CustData | Date | N | Account date-of-opening |

Step 201 may comprise many other types of data model and message model formats, worksheet formats, and methods of translating and creating, and the choice of such formats and methods is implementation-dependent. The generated worksheet may, for example, be a flat file, a word-processor table, a relational database schema, an inverted file, a knowledgebase ontology, a comma-delimited text file, or an otherwise-analyzable unstructured text file.

Methods of translating and creating may be all or partly automated, or may be performed manually, by means known to those skilled in the art, including system designers and administrators who are familiar with the operation, platforms, systems, storage formats, communications formats, or other characteristics of the source and target systems.

At the completion of step 201, embodiments of the present invention will have generated a representation of information comprised by one or more source data models, message models, or other descriptions of one or more elements of the source system, wherein this representation comprises one record, or one instance of an other data structure, for each data element of the source models or other descriptions.

In step 203, embodiments of the present invention perform a set of operations analogous to those of step 201 upon one or more data models, message models, or other descriptions of one or more elements of a target system, where the target system is distinct from the source system discussed in step 201. In a procedure analogous to that of step 201, a procedure of step 203 generates a "target worksheet" representation of information comprised by the one or more target models or descriptions, wherein this representation comprises one record, or one instance of an other data structure, for each data element of the target models or descriptions.

In an example similar to an example comprised by the description of step 201, the method of step 203 might translate a target data model that describes five elements of a subschema into a worksheet:

| Element | Table | Subschm | Fmt | PK? | Comments |
|---------|-------|---------|-----|-----|----------|
| CustName | CustInfo | Accounts | 40Str | N | 40-character customer name |
| CusrAddr | CustInfo | Accounts | 40Str | N | 40-character: customer address |
| CustStAbbr | CustInfo | Accounts | 2Str | Y | 2-char primary key: customer State |
| CustZip | CustInfo | Accounts | 9I | Y | 9-digit secondary key: customer Zip code |
| Acct# | AcctInfo | Accounts | 9I | Y | 9-digit account # |

In optional step 205, actual production data stored by the source and target systems is analyzed and the worksheets generated in steps 201 and 203 may be validated and fine-tuned as a function of the analyzing. This analysis may analyze conditional, logic, attribute, or other elements of the production data from which may be inferred or otherwise identified a condition, other logical constraint, or other characteristic associated with an element of the source or target data model or other description, wherein the condition, constraint, or characteristic has diverged from a representation of the condition, constraint, or characteristic in the source or target data model or other description.

The procedure of step 205 validates and confirms accuracy of the source and target worksheets generated in step 201 and step 203, in order to correct inconsistencies that may have arisen over time as a structure or format of a production database began to vary from the structure or format represented in its original data model.

Such inconsistencies may have arisen due to a design or implementation error, a documentation failure, or an other problem. A production database, for example, may have been updated without the update being accurately documented in a data model, or a data model may have been revised over time in ways that were not properly implemented in the production database.

In some cases, a system may have undergone a revision, such as an addition, deletion, or reformatting of a data element or of a data structure described by the source or target worksheet, wherein that revision is not accurately represented in a corresponding data model or other description. In other cases, analyzing production data may reveal conditions, dependencies, or other attributes of, or relations among, data-element values that are not accurately represented in the loaded data models. In some embodiments, only a subset of the production data is analyzed or compared in this manner, such as a subset that includes only condition fields, logical data elements, or attribute flags.

Here, loading and analyzing relevant components of source or target production data and comparing characteristics of that loaded data to characteristics of a source data model or target data model represented as a source worksheet or as a target worksheet may reveal such inconsistencies.

In one example, a worksheet generated from a target system's data model in step 203 may represent a customer's ZIP+4 ZIP code as a 9-digit "CustZip" numeric-string data element, but an analysis of the corresponding target system's production database may identify that every instance of this data element comprises a 5-digit ZIP code padded with four trailing null characters. An analysis performed in accordance with step 205 might thus respond to this identification by refining the target worksheet to represent the CustZip element as a 5-digit numeric-string variable.

In a variation of this example, the analysis of the target system's production database may identify that every instance of this data element comprises a 5-digit ZIP code padded with four trailing null characters if and only if a corresponding "ZIP5" flag is set. An analysis performed in accordance with step 205 might thus respond to this identification by adding a "ZIP5" field to each worksheet entry that describes data element "CustZip."

At the conclusion of step 205, if it is performed, the method of FIG. 2 will have generated source and target worksheets that respectively comprise descriptions of each data element of the source and target models, wherein those descriptions have been refined by comparison to actual production data analyzed in step 205. In some embodiments, step 205 will analyze production data from only the source system and use that information to refine only the source worksheet generated in step 201. In some embodiments, step 205 will analyze production data from only the target system and use that information to refine only the target worksheet generated in step 203.

In step 207, embodiments of the present invention drft a set of synchronization rules as a function on information in the source worksheet created in step 201 or step 205 and further based on information in the target worksheet created in step 203 or step 205.

These rules may be created by means of a manual procedure, an automated procedure, or a combination thereof, wherein such procedures and the means by which they may be performed are known to those skilled in the art.

In one example, a set of mapping rules may be generated by an automated modeling tool that identifies corresponding data elements in the source and target worksheets and produces, as a function of these identifications, a set of mapping rules that each associate a data element of the source worksheet with a corresponding data element of the target worksheet.

In another example, a more sophisticated automated tool may further identify data elements in either the source or target worksheet that is a concatenation of two or more fields in the other worksheet. Consider, for example, a source worksheet that describes a "CustomerInfo" table of an "Account" subschema that comprises a 12-character "First-Name" field data element and a 20-character "LastName" field data element; and a target worksheet that describes a corresponding "CustomerInfo" table of a corresponding "Account" subschema that comprises a single 32-character "CustomerName" field. Here, an automated tool may automatically generate a draft synchronization rule that associates the source "FirstName" and "LastName" data elements with the target "CustomerName" data element.

Such a draft rule might state:
IF FirstName="a" AND LastName="b"
    THEN CustomerName="ab".

Many other types of rule-generation procedures are possible and, even when source and target worksheets differ greatly, rules may be generated in this step through manual procedures or through manual revision of rules that are generated by an automatic tool.

In some cases, a draft rule may comprise an extrinsic data element that is not part of either a source data model or a target model. When this occurs, a generated rule may refer to such an extrinsic element.

In one example, consider a source system that comprises a "CustomerStreetAddress" field and a 5-digit ZIP Code data element "5ZIP," and a target system that comprises an associated "CustomerStreetAddress" field and 9-digit ZIP Code data element "9ZIP." Here, a rule may be generated that directs the synchronization mechanism to respond to a user's entry of an instance of the source system's "CustomerStreetAddress" field by: i) duplicating the entered value in the target system's "CustomerStreetAddress" field; and ii) calling an external function ZIPLOOKUP to retrieve a 9-digit ZIP Code that corresponds to the entered street-address value; and iii) storing that 9-digit value in the target system's production database.

Such a rule might read:
IF CustomerStreetAddress="a"
    THEN CustomerStreetAddress="a"
        AND 9ZIP=ZIPLOOKUP("a").

In some embodiments of the present invention, a unique identifier or Rule ID will be assigned to each generated rule. These identifiers may be propagated to each of the worksheets created by embodiments of the present invention, in order to identify rules that are associated with elements of the worksheets, such as source-system data elements, target-system data elements, extrinsic data elements, or logical rule procedures.

In some cases, the procedure of step 207 may create a "default" rule that comprises no elements of the source worksheet. Unlike synchronization rules that are triggered by a revision to a source system's production data, a default rule may be triggered by some other condition. A default rule may, for example, describe a procedure by which a date field of the target system is incremented when a system clock identifies a current time of 12:00 AM.

In some cases, the procedure of step 207 may create an "augmented" rule that, as described above processes more than one input data elements, where the rule's more than one input data elements may be a combination of source-system data elements and extrinsic data elements.

In one example of an augmented rule, consider a source system that responds to a user's entry of a credit-card number by forwarding an encrypted copy of that card number to a remote credit card-processing Web site. The external Web site then returns an authorization status code, which is stored by the source system. If the user had instead entered the card number into the target system, however, the target system would have stored the credit-card number and a viewing-authorization flag data element that tells the target system whether the user is authorized to view restricted content as a function of the received status code.

Here, a synchronization rule might describe a procedure that responds to a source-system user's entry of a credit-card number by: i) forwarding the entered number to the target system for storage; ii) augmenting the entered credit-card number by retrieving the status code extrinsic data element stored on the source system; and iii) storing a viewing-authorization flag data element in the target system's production data, where the value of the viewing-authorization flag is a function of the authorization status code.

Such a rule might read:

---
IF SourceCC# = "0000000000000000" AND AuthCode = 0
    THEN TargetCC# = "0000000000000000" AND ViewFlag = FALSE
ELSE
IF SourceCC# = "0000000000000000" AND AuthCode > 0
    THEN TargetCC# = 0000000000000000" AND ViewFlag = TRUE.
---

In some embodiments, such a rule may be too complex to be generated automatically, but system designers familiar with the workings of the source and target systems might still generate such a rule using techniques and tools known to those skilled in the art of system design, database management, or other relevant arts. In other embodiments, it may be possible to generate such rules automatically, either with or without some degree of manual configuration using techniques and tools known to those one skilled in the art.

In general, depending on details of an embodiment, generation of some or all of these draft rules will be accomplished by means of manual identification, recording, or configuration of characteristics of the source or target systems by a system administrator, system designer, or other person skilled in the relevant arts.

At the conclusion of step 207, embodiments of the present invention will have generated a draft set of synchronization rules that each define a procedure for synchronizing one or more elements of production data of the source system with one or more associated elements of production data of the target system. These rules may at least partly describe functionality of a synchronization mechanism that resolves inconsistencies between the source system and the target system that arise when either the source or the target system's production data is revised.

In step 209, a source-to-rule mapping worksheet is generated as a function of the source worksheet generated in step 201 or in step 205 and as a further function of synchronization rules generated in step 207.

As with all "worksheet" data structures generated by steps 201-205 and 209-215, the source-to-rule mapping worksheet may take the form of any structured or unstructured means of information storage that permits correlation with other worksheets generated by embodiments of the method of FIG. 2.

As with all mapping worksheets generated by steps 209-215, the source-to-rule mapping worksheet may be generated automatically from information stored in a combination of the source worksheet generated in step 201 or 205, the target worksheet generated in step 203 or 205, and the set of rules generated in step 207.

Each entry of the source-to-rule mapping worksheet associates a generated rule with a source data element, identified in the source worksheet, if the rule is associated with a source data element.

If a rule is a default rule, an entry in the source-to-rule mapping worksheet that corresponds to the default rule will not identify a source data element. If a rule is an augmented rule that is associated with two or more source or extrinsic data elements, the source-to-rule mapping worksheet will comprise an entry for each rule/element combination. An augmented rule that comprises two source data elements will, for example, be represented by two entries in the source-to-rule mapping worksheet.

Each entry may contain other data elements that describe associated characteristics of the entry's rule or of the entry's data element. Embodiments of the present invention may automatically identify and extract values of these associated characteristics from the source worksheet generated in step 201 or step 205. The selection and sequence of these associated characteristics are implementation-dependent and may comprise, but are not limited to, data elements such as an identifier of a table that comprises the entry's data element, a source data count value that identifies how many source elements are associated with the entry's rule, or a link to an entry in the extrinsic data-to-rule mapping worksheet (generated in step 213), wherein the entry in the extrinsic data-to-rule mapping worksheet is associated with an extrinsic data element comprised by the rule. Many other variations are possible.

In one example, a record of a source-to-rule mapping worksheet (wherein the worksheet is implemented as a relational database table) may contain a record for a rule assigned an identifier AZN-R00015, where that rule is triggered by any event that affects a source-system data element TAX.TM.

Such a record may, in this particular embodiment, further comprise fields retrieved automatically from a source worksheet generated in step 201 or step 205, or from extrinsic data elements associated with the rule AZN-R00015. Here, those further-comprised fields identify a parent table and data type of the TAX.TM element and link the record to an entry in an extrinsic data-to-rule mapping worksheet that describes an extrinsic data elements required by rule AZN-R00015. The record might also comprise a free-text comment that is entered manually or that is imported automatically, during the generation of the source-to-rule mapping table in step 209.

Such a record might thus comprise:

| RuleID | Source Element | Table | Fmt | Ext Element | Comments |
|---|---|---|---|---|---|
| AZN-R00015 | TAX.TM | TAX | I4.2 | MarginalRates | Rule for synchronizing $0000.00 data element as fn of marginal tax-rate ext element |

In this simple example, both RuleID and Source Element might be designated index fields or keys, by which records of the source-to-rule mapping worksheet may be queried.

If rule AZN-R00015 comprises three source elements—thus requiring three such entries in the mapping worksheet—it would thus be possible to identify and retrieve those three entries with a single query by querying the source-to-rule mapping worksheet by RuleID.

Other embodiments of the present invention may maintain a distinct source-to-rule cross-reference data structure that allows quick queries of this nature, based on the data stored in the mapping worksheets created in steps 209-213.

In some embodiments, the rule-to-mapping worksheet may further contain automatically generated "count" fields that identify a number of source data elements associated with a rule, that identify a number of extrinsic data elements associated with a rule, or that identify a total number of source and extrinsic data elements associated with a rule. Such a field may allow efficient identification of augmented rules, which, as described above, may be characterized as rules that depend upon more than one input data element.

Consider, for example, a synchronization rule R00099 that states:

IF SourceField A="A" AND SourceFieldB="Y" AND SourceFieldC="2" THEN TargetFieldA="12".

Here, when a user revises only SourceFieldB in a source system database, the synchronization rule must retrieve unrevised SourceFieldA and SourceFieldC from the source database order to properly set TargetFieldA in a target system database. In some embodiments, such a rule might spawn three records in the source-to-rule mapping worksheet for rule R00099.

Each of the three records would associate RuleID R00099 with one of the three Source Elements SourceFieldA, SourceFieldB, and SourceFieldC. Each of these three records would further comprise a "count" field that identifies a value of "3," indicating that rule R00099 requires three source fields.

At the completion of step 209, the method of FIG. 2 will have created a source-to-rule mapping worksheet cross-reference that allows a synchronization mechanism to quickly identify all rules that are associated with a particular source data element, or to quickly identify all source data elements that are associated with a particular rule. In some embodiments, this mapping worksheet will be updated automatically whenever a revision is made to the source worksheet generated in step 201 or step 205, to the target worksheet generated in step 203 or step 205, or to the synchronization rules generated in step 207.

The procedure of step 211 generates an extrinsic data-to-rule mapping worksheet by means of a procedure that is analogous to the procedure that step 209 performs for the source system. At the completion of step 211, the method of FIG. 2 will have created an extrinsic data-to-rule mapping worksheet that allows a synchronization mechanism to quickly identify all rules that are associated with a particular extrinsic data element, or to quickly identify all extrinsic data elements that are associated with a particular rule.

Similar to the procedure of step 209, the procedure of step 211 may generate this mapping worksheet through a combination of manual and automated procedures that formally identify relationships among extrinsic data elements and generated synchronization rules, as such relationships were identified, determined, or otherwise characterized in step 207.

The procedure of step 213 performs a function for the target system that is analogous to the function that step 209 performs for the source system. At the completion of step 213, the method of FIG. 2 will have created a target-to-rule mapping worksheet that allows a synchronization mechanism to quickly identify all rules that are associated with a particular target data element, or to quickly identify all target data elements that are associated with a particular rule.

Similar to the procedure of step 209, the procedure of step 213 may generate this mapping worksheet through a combination of manual and automated procedures that correlate data elements in the target worksheet generated in step 203 or in step 205 with rules generated in step 207.

Similarly, the procedure of step 213 generates an extrinsic-data-to-rule mapping worksheet by means of methods similar to the procedures of steps 209 and 211. Here, the extrinsic-data-to-rule mapping worksheet maps a synchronization rule to one or more extrinsic data elements identified in step 207.

In a procedure analogous to procedures associated with the worksheets generated in steps 209 and 213, this worksheet may be used to identify and retrieve all rules associated with a specified extrinsic data element and may be used to identify and retrieve all extrinsic data elements associated with a specified rule. Here, as described above, an extrinsic data element is one that is required by a rule, but may be identified or retrieved from an information repository other than the source or target data models.

Furthermore, like the mapping worksheets generated in steps 209 and 213, each record of this worksheet need comprise only an identifier of a rule and an identifier of a data element. Any other required data attributes or field values in the record may be automatically retrieved from the other worksheets or from rules generated in steps 201-207. If, for example, an identified rule is associated with a first record in the source-to-rule mapping worksheet and with a second record in the target-to-rule mapping worksheet, any information in either of those source or target-mapping worksheets may be automatically imported into the corresponding extrinsic-data-to-rule mapping worksheet.

As with the other worksheets generated by this method, the exact organization and structure of the extrinsic-data-to-rule mapping worksheet may be implementation-dependent and may be automatically or manually generated and populated by system designers or administrators using means known to those skilled in the art.

In step 215, embodiments of the present invention generate a rule-pseudocode worksheet that documents the logic associated with each rule in a predetermined format. In some embodiments, this logic may be represented for a rule that performs a complex function as a pseudocode program. In cases wherein a rule comprises a simple mapping function or a straightforward association between a source data element and a target data element, or between 0-to-many source data elements and 1-to-many target data elements, complex logic may not be required and the rule's entry in this pseudocode worksheet may comprise a set of identifiers of data elements associated with the rule.

In some embodiments, each entry in this worksheet may be further populated with data items automatically retrieved from other worksheets generated by the method of the present invention. An entry might, for example, comprise a count field that indicates how many source elements or extrinsic elements are associated with the field; an attribute that indicates whether the rule is a simple mapping rule or a more complex logic-based transform rule that performs an algorithm represented in pseudocode; a default return value for the rule; a free text comment that describes the function, triggering conditions, or purpose of the rule; or any other descriptive information that may be automatically retrieved from an other worksheet comprised by the embodiment.

In some embodiments, key or index values may be assigned to specific fields in this worksheet. In other embodiments, every field or descriptive data element of this worksheet, as with other worksheets generated by embodiments of this invention, may function as a key or index.

At the conclusion of step 215, embodiments of the present invention will have generated a full complement of worksheets that may be used to configure and drive a mechanism for synchronizing two or more systems. These worksheets will comprise a source worksheet that is a function of one or more data models or other descriptions of data elements of a source system; a target worksheet that is a function of one or more data models or other descriptions of data elements of a target system; a set of three mapping worksheets that associate synchronization rules respectively with source data elements, extrinsic data elements, and target data elements; and a rules-pseudocode worksheet that documents the functionality performed by each rule.

Embodiments of the present invention implement these worksheets as linked data structures, and a record of any one of these worksheets may be updated automatically when a corresponding record of an other worksheet is revised. Furthermore, in some embodiments, cross-reference data structures may be automatically generated from the three mapping worksheets that allow the quick identification of synchronization rules associated with a specific source, extrinsic, or target data element; and that allow the quick identification of source, extrinsic, or target data elements associated with a specific synchronization rule.

In step 217, embodiments of the present invention perform a continuous or continual process of monitoring the integrity of the synchronization system. Step 217 may be performed periodically on a fixed schedule, in response to an occurrence or non-occurrence of a condition, or on an ad hoc basis determined by a system administrator or other person responsible for operation of the source system, the target system, or the synchronization mechanism.

In step 217, an embodiment of the present invention updates information that describes the operation of, or an other characteristic of, the source system, the target system, or the synchronization mechanism.

Such an update may comprise steps such as updating the source worksheet by loading an update of a source data model, updating the target worksheet by loading an update of a target data model, updating a synchronization rule as a function of an update to a business rule, or any other update that may require updating the workbooks generated in steps 201-215.

In step 219, embodiments of the present invention determine whether the workbooks generated in steps 201-215 must be updated in response to the procedure of step 217.

If no updates were loaded or otherwise identified in step 217, the procedure of FIG. 2 takes no further action during this iteration of the iterative process of steps 217-221, and the next iteration of this iterative process may begin.

If, however, an update was loaded or otherwise identified in step 217, the procedure of FIG. 2 continues with step 221, which updates the workbooks generated in steps 201-215 accordingly.

These updates may mirror the procedures of steps 201-215. In some cases, a revised source data model may be used to update or replace the source worksheet originally generated in step 201 or step 205, or a revised target data model may be used to update or replace the target worksheet originally generated in step 203 or step 205. In other cases, a synchronization rule originally generated in step 207 or documented in step 215 may be replaced or updated. If such updates are performed in step 221, the linked nature of the worksheets generated in other steps of the method of FIG. 2 will propagate these revisions automatically throughout the associated worksheets and thus throughout the entire synchronization mechanism.

In one example, an embodiment of the present invention might replace the current source worksheet or update a subset of the current source worksheet, through worksheet-creation methods analogous to those of step 201, by loading information from one or more data models or other descriptions of one or more data elements, data structures, message elements, or logic elements associated with the source system and by then translating the loaded information into a format that allows the information to be imported into or to replace all or part of the existing content of the source worksheet. In some embodiments, this step may be performed manually, automatically, or as a combination of manual and automatic steps in response to a manual or automatic notification of a revision to a data model or other description associated with the source system.

Similarly, an embodiment of the present invention might replace the current target worksheet or update a subset of the current target worksheet, through worksheet-creation methods analogous to those of step 203, by loading information from one or more data models or other descriptions of one or more data elements, data structures, message elements, or logic elements associated with the target system and by then translating the loaded information into a format that allows the information to be imported into or to replace all or part of the existing content of the target worksheet. In some embodiments, this step may be performed manually, automatically, or as a combination of manual and automatic steps in response to a manual or automatic notification of a revision to a data model or other description associated with the target system.

In another example, an embodiment of the present invention might in step 217 load elements of a source or target production database, as in step 205, analyze the loaded elements and use those elements, by means of a further procedure analogous to that of step 205, determine that all or part of the source or target worksheet needs to be updated or replaced in step 219, and then perform such an updating or replacement in step 221. Such procedures might be performed manually, automatically, or as a combination of manual and automatic steps in response to a manual or automatic notification of a revision to an element of source-system or target-system production data.

Similarly, an update to a business rule, a business procedure, a business process, or to an other worksheet generated in steps 201-215 may trigger an analysis and update to one or more worksheets in steps 217-221, where such an update may comprise revising or replacing all or part of the information associated with one or more synchronization rules. Such an updating might be performed manually, automatically, or as a combination of manual and automatic steps.

In all these cases, any updating, replacing, or other type of revision to a worksheet generated by an embodiment of the present invention may be automatically propagated across some or all of the other generated worksheets by means of linkages, associations, or other relationships between entries of the worksheets.

In summary, the iterative process of steps 217-221 monitors revisions to characteristics of the source or target systems, to data models or other representations of the organizations of the source or target systems, to information stored and managed by the source or target system, or to business procedures, conventions, standards, or methods associated with the stored synchronization rules, and automatically responds to such a revision by updating the worksheets generated by steps 201-215, including the representations of the source and target systems stored in the worksheets and the representations of the synchronization mechanism's synchronization rules stored in the worksheets. This process may, in some embodiments, continue indefinitely in order to guarantee continued automatic synchronization of the source and target systems whenever a characteristic of either system, or of the synchronization mechanism, occurs.

At the conclusion of the method of step 221, the iterative process of steps 217-221 ends, and the next iteration of this iterative process may begin.

What is claimed is:

1. A method for automatically synchronizing production data of a source system and a target system, where a source data worksheet represents a logical organization of a source repository of production data managed by the source system, a target data worksheet represents a logical organization of a target repository of production data managed by the target system, a record of the source data worksheet describes a logical source data element comprised by the logical organization of the source repository, a record of the target data worksheet describes a logical target data element comprised by the logical organization of the target repository, and a first synchronization rule of the set of synchronizations rules instructs a processor of a computer system how to resolve a first inconsistency between the logical source data element and the logical target data element, the method comprising:

a processor of a computer system generating a source-to-rule mapping worksheet, where a first record of the source-to-rule mapping worksheet associates the logical source data element with the first synchronization rule;

the processor creating an extrinsic data-to-rule mapping worksheet, where a record of the extrinsic data-to-rule mapping worksheet is capable of associating an extrinsic data element with the first synchronization rule, where the extrinsic data element is comprised by neither the source repository nor the target repository, where the record of the extrinsic data-to-rule mapping worksheet associates the extrinsic data element with the first synchronization rule, where the extrinsic data element comprises a distinct element of data associated with an external information source, where the external information source is distinct from any component of the source system, the target system, the source repository, and the target repository, and where the logical procedure of the first synchronization rule depends upon a value of the extrinsic data element;

the processor producing a target-to-rule mapping worksheet, where a record of the target-to-rule mapping worksheet associates the logical target data element with the first synchronization rule;

the processor constructing a rule-logic worksheet, where a record of the rule-logic worksheet associates the first synchronization rule with a logical procedure by which the processor may resolve the first inconsistency; and the processor automatically responding to a revision to a first revised record of a first worksheet by automatically revising a second revised record of a second worksheet, where the first worksheet is distinct from the second worksheet, the first worksheet and the second worksheet are selected from the group consisting of the source data worksheet, the target data worksheet, the source-to-rule mapping worksheet, the extrinsic data-to-rule mapping worksheet, the target-to-rule mapping worksheet, and the rule-logic worksheet, and where the automatically revising is performed by means of a linkage between the first revised record and the second revised record.

2. The method of claim 1, further comprising:

the processor analyzing a subset of the source data stored in the source repository and a subset of target data stored in the target repository; and the processor updating the source data worksheet and the target data worksheet as a function of the analyzing.

3. The method of claim 1, further comprising:

the processor receiving an indication of a revision to the logical organization of the source repository, to the logical organization of the target repository, or to the first synchronization rule;

the processor responding to the receiving by further revising a related worksheet selected from the group comprising the source data worksheet, the target data worksheet, or the rule-logic worksheet; and the processor automatically updating a linked worksheet selected from the group comprising the source data worksheet, the target data worksheet, the source-to-rule mapping worksheet, the extrinsic data-to-rule mapping worksheet, the target-to-rule mapping worksheet, and the rule-logic worksheet, in response to the further revising the related worksheet, where the linked worksheet is distinct from the related worksheet.

4. The method of claim 1, where the logical procedure comprises copying an element of source data comprised by the source repository to a target storage location comprised by the target repository, and where the element of source data is associated with the logical source data element and the target storage location is associated with the logical target data element.

5. The method of claim 1, where the logical procedure is a business function, where the business function is selected from the group comprising a business process, a convention or standard of operation, and a business method, the method further comprising:

the processor receiving an indication of a revision to the business function;

the processor responding to the receiving by further revising the record of the rule-logic worksheet; and the processor automatically updating a linked worksheet selected from the group comprising the source data worksheet, the target data worksheet, the source-to-rule mapping worksheet, the extrinsic data-to-rule mapping worksheet, and the target-to-rule mapping worksheet.

6. The method of claim 1, further comprising providing at least one support service for at least one of creating, integrating, hosting, maintaining, and deploying computer-readable program code in the computer system, where the computer-readable program code in combination with the computer system is configured to implement the generating, the creating, the producing, the constructing, and the automatically responding.

7. A computer program product, comprising a computer-readable hardware storage device having a computer-readable program code stored therein, said program code configured to be executed by a processor of a computer system to implement a method for automatically synchronizing production data of a source system and a target system, where a source data worksheet represents a logical organization of a source repository of production data managed by the source system, a target data worksheet represents a logical organization of a target repository of production data managed by the target system, a record of the source data worksheet describes a logical source data element comprised by the logical organization of the source repository, a record of the target data worksheet describes a logical target data element comprised by the logical organization of the target repository, and a first synchronization rule of the set of synchronizations rules instructs a processor of a computer system how to resolve a first inconsistency between the logical source data element and the logical target data element, the method comprising:

the processor generating a source-to-rule mapping worksheet, where a first record of the source-to-rule mapping worksheet associates the logical source data element with the first synchronization rule;

the processor creating an extrinsic data-to-rule mapping worksheet, where a record of the extrinsic data-to-rule mapping worksheet is capable of associating an extrinsic data element with the first synchronization rule, where the extrinsic data element is comprised by neither the source repository nor the target repository, where the record of the extrinsic data-to-rule mapping worksheet associates the extrinsic data element with the first synchronization rule, where the extrinsic data element comprises a distinct element of data associated with an external information source, where the external information source is distinct from any component of the source system, the target system, the source repository, and the target repository, and where the logical procedure of the first synchronization rule depends upon a value of the extrinsic data element;

the processor producing a target-to-rule mapping worksheet, where a record of the target-to-rule mapping worksheet associates the logical target data element with the first synchronization rule;

the processor constructing a rule-logic worksheet, where a record of the rule-logic worksheet associates the first synchronization rule with a logical procedure by which the processor may resolve the first inconsistency; and the processor automatically responding to a revision to a first revised record of a first worksheet by automatically revising a second revised record of a second worksheet, where the first worksheet is distinct from the second worksheet, the first worksheet and the second worksheet are selected from the group consisting of the source data worksheet, the target data worksheet, the source-to-rule mapping worksheet, the extrinsic data-to-rule mapping worksheet, the target-to-rule mapping worksheet, and the rule-logic worksheet, and where the automatically revising is performed by means of a linkage between the first revised record and the second revised record.

8. The computer program product of claim 7, further comprising:

the processor analyzing a subset of the source data stored in the source repository and a subset of target data stored in the target repository; and the processor updating the source data worksheet and the target data worksheet as a function of the analyzing.

9. The computer program product of claim 7, further comprising:

the processor receiving an indication of a revision to the logical organization of the source repository, to the logical organization of the target repository, or to the first synchronization rule;

the processor responding to the receiving by further revising a related worksheet selected from the group comprising the source data worksheet, the target data worksheet, or the rule-logic worksheet; and the processor automatically updating a linked worksheet selected from the group comprising the source data worksheet, the target data worksheet, the source-to-rule mapping worksheet, the extrinsic data-to-rule mapping worksheet, the target-to-rule mapping worksheet, and the rule-logic worksheet, in response to the further revising the related worksheet, where the linked worksheet is distinct from the related worksheet.

10. The computer program product of claim 7, where the logical procedure comprises copying an element of source data comprised by the source repository to a target storage location comprised by the target repository, and where the element of source data is associated with the logical source data element and the target storage location is associated with the logical target data element.

11. The computer program product of claim 7, where the logical procedure is a business function, where the business function is selected from the group comprising a business process, a convention or standard of operation, and a business method, the method further comprising:

the processor receiving an indication of a revision to the business function;

the processor responding to the receiving by further revising the record of the rule-logic worksheet; and the processor automatically updating a linked worksheet selected from the group comprising the source data worksheet, the target data worksheet, the source-to-rule mapping worksheet, the extrinsic data-to-rule mapping worksheet, and the target-to-rule mapping worksheet.

12. A computer system comprising a processor, a memory coupled to said processor, and a computer-readable hardware storage device coupled to said processor, said storage device containing program code configured to be run by said processor via the memory to implement a method for automatically synchronizing production data of a source system and a target system, where a source data worksheet represents a logical organization of a source repository of production data managed by the source system, a target data worksheet represents a logical organization of a target repository of production data managed by the target system, a record of the source data worksheet describes a logical source data element comprised by the logical organization of the source repository, a record of the target data worksheet describes a logical target data element comprised by the logical organization of the target repository, and a first synchronization rule of the set of synchronizations rules instructs a processor of a computer system how to resolve a first inconsistency between the logical source data element and the logical target data element, the method comprising:

the processor generating a source-to-rule mapping worksheet, where a first record of the source-to-rule mapping worksheet associates the logical source data element with the first synchronization rule;

the processor creating an extrinsic data-to-rule mapping worksheet, where a record of the extrinsic data-to-rule mapping worksheet is capable of associating an extrinsic data element with the first synchronization rule, where the extrinsic data element is comprised by neither the source repository nor the target repository, where the record of the extrinsic data-to-rule mapping worksheet associates the extrinsic data element with the first synchronization rule, where the extrinsic data element comprises a distinct element of data associated with an external information source, where the external information source is distinct from any component of the source system, the target system, the source repository, and the target repository, and where the logical procedure of the first synchronization rule depends upon a value of the extrinsic data element;

the processor producing a target-to-rule mapping worksheet, where a record of the target-to-rule mapping worksheet associates the logical target data element with the first synchronization rule;

the processor constructing a rule-logic worksheet, where a record of the rule-logic worksheet associates the first synchronization rule with a logical procedure by which the processor may resolve the first inconsistency; and the processor automatically responding to a revision to a first revised record of a first worksheet by automatically revising a second revised record of a second worksheet, where the first worksheet is distinct from the second worksheet, the first worksheet and the second worksheet are selected from the group consisting of the source data worksheet, the target data worksheet, the source-to-rule mapping worksheet, the extrinsic data-to-rule mapping worksheet, the target-to-rule mapping worksheet, and the rule-logic worksheet, and where the automatically revising is performed by means of a linkage between the first revised record and the second revised record.

13. The computer system of claim 12, further comprising:
the processor analyzing a subset of the source data stored in the source repository and a subset of target data stored in the target repository; and
the processor updating the source data worksheet and the target data worksheet as a function of the analyzing.

14. The computer system of claim 12, further comprising:
the processor receiving an indication of a revision to the logical organization of the source repository, to the logical organization of the target repository, or to the first synchronization rule;
the processor responding to the receiving by further revising a related worksheet selected from the group comprising the source data worksheet, the target data worksheet, or the rule-logic worksheet; and
the processor automatically updating a linked worksheet selected from the group comprising the source data worksheet, the target data worksheet, the source-to-rule mapping worksheet, the extrinsic data-to-rule mapping worksheet, the target-to-rule mapping worksheet, and the rule-logic worksheet, in response to the further revising the related worksheet, where the linked worksheet is distinct from the related worksheet.

15. The computer system of claim 12,
where the logical procedure comprises copying an element of source data comprised by the source repository to a target storage location comprised by the target repository, and
where the element of source data is associated with the logical source data element and the target storage location is associated with the logical target data element.

16. The computer system of claim 12, where the logical procedure is a business function, where the business function is selected from the group comprising a business process, a convention or standard of operation, and a business method, the method further comprising:
the processor receiving an indication of a revision to the business function;
the processor responding to the receiving by further revising the record of the rule-logic worksheet; and
the processor automatically updating a linked worksheet selected from the group comprising the source data worksheet, the target data worksheet, the source-to-rule mapping worksheet, the extrinsic data-to-rule mapping worksheet, and the target-to-rule mapping worksheet.

* * * * *